(12) United States Patent
Cunningham et al.

(10) Patent No.: US 7,744,746 B2
(45) Date of Patent: Jun. 29, 2010

(54) FCC CATALYST STRIPPER CONFIGURATION

(75) Inventors: Brian A. Cunningham, Ellicott City, MD (US); Christopher G. Smalley, Manassas, VA (US); Richard C. Senior, Mandeville, LA (US); Joseph S. Famolaro, Sway (GB); Rathna P. Davuluri, Fairfax, VA (US); David L. Johnson, Clifton, VA (US); James H. Beech, Kingwood, TX (US); Jeffrey S. Smith, Texas City, TX (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 226 days.

(21) Appl. No.: 11/729,353

(22) Filed: Mar. 28, 2007

(65) Prior Publication Data
US 2007/0251863 A1 Nov. 1, 2007

Related U.S. Application Data

(60) Provisional application No. 60/788,147, filed on Mar. 31, 2006.

(51) Int. Cl.
*C10G 11/02* (2006.01)
(52) U.S. Cl. .................. 208/121; 208/113; 208/119; 422/144
(58) Field of Classification Search .................. 422/144; 208/113, 119, 121
See application file for complete search history.

(56) References Cited

U.S. PATENT DOCUMENTS

| | | | |
|---|---|---|---|
| 3,480,406 A | 11/1969 | Luckenbach |
| 4,364,905 A | 12/1982 | Fahrig et al. |
| 4,414,100 A | 11/1983 | Krug et al. |
| 4,499,327 A | 2/1985 | Kaiser |
| 4,597,771 A | 7/1986 | Cheng |
| 4,670,993 A | 6/1987 | Dunaway et al. |
| 4,677,242 A | 6/1987 | Kaiser |
| 4,677,243 A | 6/1987 | Kaiser |
| 4,684,375 A | 8/1987 | Morin et al. |
| 4,752,651 A | 6/1988 | Kaiser |
| 4,927,606 A | 5/1990 | Cetinkaya et al. |
| 4,973,792 A | 11/1990 | Lewis et al. |

(Continued)

FOREIGN PATENT DOCUMENTS

GB 2171718 A 9/1986

(Continued)

OTHER PUBLICATIONS

Jin, Y. et al (2003). "Effect of Internal Tubes and Baffles," in Handbook of Fluidization and Fluid-particle Systems, Marcel-Dekker, pp. 175-181 & 184-186.*

(Continued)

*Primary Examiner*—Robert J Hill, Jr.
*Assistant Examiner*—Brian McCaig
(74) *Attorney, Agent, or Firm*—Bruce M. Bordelon

(57) ABSTRACT

This invention relates to the catalytic cracking of a hydrocarbon feed. In particular, this invention relates to an apparatus and process utilizing a catalyst stripper section of a fluid catalytic cracking (FCC) reactor with chordal trays designed to provide improved stripping of hydrocarbons from spent FCC catalyst in an FCC reactor stripping zone.

23 Claims, 13 Drawing Sheets

U.S. PATENT DOCUMENTS

| | | | |
|---|---|---|---|
| 5,475,182 A | 12/1995 | Janssen | |
| 5,531,884 A | 7/1996 | Johnson et al. | |
| 5,714,662 A | 2/1998 | Vora et al. | |
| 5,716,585 A | 2/1998 | Senegas et al. | |
| 5,744,680 A | 4/1998 | Mulvaney, III et al. | |
| 5,817,906 A | 10/1998 | Marker et al. | |
| 5,914,433 A | 6/1999 | Marker | |
| 5,962,762 A | 10/1999 | Sun et al. | |
| 5,990,369 A | 11/1999 | Barger et al. | |
| 6,005,150 A | 12/1999 | Vora | |
| 6,023,005 A | 2/2000 | Lattner et al. | |
| 6,040,264 A | 3/2000 | Sun et al. | |
| 6,121,503 A | 9/2000 | Janssen et al. | |
| 6,121,504 A | 9/2000 | Kuechler et al. | |
| 6,166,282 A | 12/2000 | Miller | |
| 6,187,983 B1 | 2/2001 | Sun | |
| 6,248,298 B1 | 6/2001 | Senior et al. | |
| 6,303,839 B1 | 10/2001 | Marker | |
| 6,303,841 B1 | 10/2001 | Senetar et al. | |
| 6,441,261 B1 | 8/2002 | Kuechler et al. | |
| 6,455,747 B1 | 9/2002 | Lattner et al. | |
| 6,455,749 B1 | 9/2002 | Vaughn | |
| 6,482,998 B1 | 11/2002 | Kuechler et al. | |
| 6,482,999 B2 | 11/2002 | Fung et al. | |
| 6,680,030 B2 | 1/2004 | Koebel et al. | |
| 2001/0020119 A1 | 9/2001 | Janssen et al. | |
| 2002/0087041 A1 | 7/2002 | Kuechler et al. | |
| 2003/0004384 A1 | 1/2003 | Coute et al. | |
| 2004/0101449 A1* | 5/2004 | Marchant et al. | 422/144 |
| 2005/0040075 A1 | 2/2005 | Cerqueira et al. | |
| 2005/0205467 A1 | 9/2005 | Hedrick et al. | |

FOREIGN PATENT DOCUMENTS

| | | |
|---|---|---|
| WO | WO 97/36845 | 10/1997 |
| WO | WO 98/02471 | 1/1998 |
| WO | WO 00/41986 | 7/2000 |
| WO | WO 01/62689 A1 | 8/2001 |
| WO | WO 02/32837 A1 | 4/2002 |
| WO | WO 2005/061418 | 7/2005 |

OTHER PUBLICATIONS

H. Dries, F. Muller, P. Willbourne, M. Fum, E. P. Williams; "Consider using new technology to improve FCC unit reliability," Hydrocarbon Processing, Feb. 2005, pp. 69-75.

* cited by examiner

Row A

Row B

Row C

Row D (at constant stripping gas velocity of $U_g$ = 1.0 ft/s)

Flux values shown in graph represent flux rates in FCC reactor standpipe

FCC CATALYST STRIPPER CONFIGURATION

CROSS-REFERENCE TO RELATED APPLICATIONS

This application is a United States utility application which claims priority to U.S. Provisional Patent Application Ser. No. 60/788,147, filed on Mar. 31, 2006.

FIELD OF THE INVENTION

This invention relates to the catalytic cracking of a hydrocarbon feed. In particular, this invention relates to an apparatus and process utilizing a catalyst stripper section of a fluid catalytic cracking (FCC) reactor with chordal trays designed to provide improved stripping of hydrocarbons from spent FCC catalyst in an FCC reactor stripping zone.

BACKGROUND OF THE INVENTION

Conversion of high molecular weight petroleum feeds to more valuable products is important to petroleum processes such as fluidized catalytic cracking (FCC) and coking. In the FCC process, high molecular weight feeds are contacted with fluidized catalyst particles in the riser reactor of the FCC unit. The contacting between feed and catalyst is controlled according to the type of product desired. In catalytic cracking of the feed, reactor conditions such as temperature and contact time are controlled to maximize the products desired and minimize the formation of less desirable products such as light gases and coke.

Miscellaneous FCC riser and reactor designs have been utilized. However, with the advance of zeolitic cracking catalysts with greatly improved cracking activity, most modern FCC reactors utilize a short-contact time cracking configuration in which the amount of time that the catalyst and the FCC feedstream are in contact is limited in order to minimize the amount of excessive cracking which results in the increased production of less valued products such as light hydrocarbon gases as well as increased coking deposition on the cracking catalysts. Most short-contact time FCC configurations utilize a riser cracking configuration wherein the catalyst is contacted with the FCC reactor hydrocarbon feedstock in a riser and the catalyst and the hydrocarbon reaction products are separated shortly after the catalyst and hydrocarbon mixture leaves the riser and enters the reactor. Although there are many different FCC reactor designs in use, most use mechanical cyclones internal to the reactor to separate the catalyst from the hydrocarbon reactor products as quickly and efficiently as possible. This rapid separation process has the benefits of both minimizing post-riser reactions between the catalyst and the hydrocarbons as well as providing a physical means for separating the products to be sent for further processing from the spent catalyst which is sent to a regenerator stage prior to reintroducing as regenerated catalyst back into the reaction process.

This improved catalyst technology has led to the ability for existing FCC units to improve throughput in the reactor section of existing equipment. However, this improved reaction section performance has resulted in shifting process rate bottlenecks to other existing FCC equipment which may prevent the reactor section from operating at improved or maximum rates. Non-limiting examples of equipment that are the focus of rate improvement modifications are the FCC reactor stripping section and the FCC regenerator section.

The FCC reactor stripping section, in particular, is important to maximizing the throughput of the FCC reaction/regenerator section. The FCC stripper utilizes a stripping medium, usually steam, to strip hydrocarbons from the spent FCC catalyst prior to the catalyst being sent to the FCC regenerator. In the FCC regenerator, the spent catalyst is subjected to temperatures from about 1100 to about 1400° F. (593 to 760° C.) in order to regenerate the catalyst activity by burning the residual hydrocarbons and coke deposits from the catalyst prior to sending catalyst, in its regenerated state, back to the reaction stage of the FCC process. Whatever hydrocarbons are not effectively stripped off of the catalyst in the stripping section are sent to the regenerator zone resulting in an increased combustion load on the FCC regenerator as well as having several other adverse impacts to an FCC unit. If the particular FCC process is regenerator rate limited, insufficient stripping of hydrocarbons in the FCC stripper can be a direct cause of loss in overall unit throughput.

The efficiency of the stripping section of the process is therefore very important to the overall throughput of the FCC process as well as to the efficiency and environmental performance of an FCC unit. In addition to the rate limiting aspect of improper or inefficient hydrocarbon stripping mentioned above, inefficient FCC stripping can also result in loss of product, increased emissions, increased steam usage, and related detrimental affects. Any residual hydrocarbon product that is not removed from the spent catalyst in the FCC stripper becomes lost product. If the hydrocarbon residue is not stripped prior to leaving the stripper section, it is combusted in the FCC reactor section. Besides the corresponding loss of product, this additional combustion is undesired as it increases contaminant concentrations in the regenerator flue gas and/or increases the regenerator flue gas rate resulting in increased air pollutant emissions from the FCC unit. Additionally, an inefficiently designed FCC stripping section will result in the use of an excess amount of stream in the FCC stripper and reactor. This excess steam can result in a decrease overall hydrocarbon processing capacity in the associated FCC fractionator tower as well as increasing the amount of water that must be removed from the hydrocarbon product and subsequently treated prior to disposal or reuse.

There have been apparatus designs intended to improve the catalyst/stripping gas contact in the FCC stripper. Many "disc and donut" stripper tray designs have been proposed to improve the stripping process associated with the "annular riser" FCC reactors. An FCC annular riser reactor has the riser section entering through the bottom of the reactor and rising up through the center axis of the FCC reactor. Examples of annular tray designs can be seen in U.S. Pat. Nos. 5,531,884, and 6,248,298. In contrast with the riser configuration of the FCC axial riser design, an external riser FCC reactor configuration is designed where the main feed/catalyst riser or risers does not enter axially through the bottom of the FCC reactor, but instead is external to the FCC reactor until it enters the reactor, usually in the side of the reactor, somewhere in the upper section of the FCC reactor. An additional, somewhat hybrid design is what is termed herein and described more fully as an FCC "S" riser reactor design.

In addition to the various tray designs, packing designs have been proposed to increase the stripping efficiency of an FCC stripper. U.S. Pat. No. 5,716,585 and United States Publication Number US 2005/0205467 illustrate the use of packing configurations in an FCC stripper. While these designs may be theoretically efficient, packing in an FCC stripper service can have several significant disadvantages as compared to stripper tray or shed designs. The packing can be prone to plugging, resulting in capacity restrictions, or bypassing and channeling, which can result in poor long-term stripping efficiencies, especially when considering that an average FCC unit is designed to run from 3 to 6 years between reactor maintenance downtime cycles. In addition, grid packing can be expensive and difficult to install as compared to tray or shed designs, as well as being an obstruction to internal access of the reactor during maintenance cycles requiring removal, cleaning, and reassembly or replacement during periodic FCC reactor maintenance cycles.

Therefore, there exists in the industry a need for an improved stripper section design for an external riser FCC reactor that is simple to install and maintain, is not prone to plugging or channeling, and has improved hydrocarbon/catalyst separation efficiencies.

SUMMARY OF THE INVENTION

One embodiment of the present invention is a fluid catalytic cracking reactor stripper, comprising:
 a) a plurality of stripping trays configured in a plurality of horizontal tray rows at differing elevations within the reactor stripper; wherein,
 b) each tray row is comprised of at least two chordal trays; and
 c) at least one tray row is rotated such that the longitudinal axes of the tray row are at a different planar angle than the planar angle of the tray longitudinal axes of at least one other tray row in the reactor stripper.

In a preferred embodiment of the present invention, the longitudinal axes of each tray row in the reactor stripper are oriented at planar angles selected from 0°, 30°, 45°, 60° and 90° with respect to at least one other tray row in the reactor stripper.

In another preferred embodiment of the present invention, two or more adjoining tray rows in the reactor stripper have the same planar angle of tray longitudinal axes.

In yet another embodiment of the present invention, no adjoining tray rows in the reactor stripper have the same number of trays.

In a preferred embodiment of the present invention, the chordal trays are arranged such that the tray row open area of each tray row in the reactor stripper is within 10% of the mean tray row open area of all the rows in the reactor stripper.

One embodiment of the present invention is a fluid catalytic cracking process, comprising:
 (a) contacting a hydrocarbon feed with regenerated catalyst in an external riser of a fluid catalytic cracking reactor to produce a cracked product and a spent catalyst;
 (b) separating a portion of the cracked product from the spent catalyst in a reactor separation zone;
 (c) passing the spent catalyst containing hydrocarbons to the inlet of a reactor stripper section comprised of chordal trays, wherein each tray row is comprised of at least two chordal trays, and at least one tray row is rotated such that the chordal tray longitudinal axes of the tray row are at a different planar angle than the planar angle of the tray longitudinal axes of at least one other tray row in the reactor stripper section;
 (d) contacting the spent catalyst with a stripping medium in the reactor stripper section;
 (e) stripping at least a portion of the hydrocarbons from the spent catalyst in the reactor stripper section; and
 (f) removing a stripped spent catalyst from the reactor stripper section.

In yet another preferred embodiment, an FCC reactor comprises a transition zone in mechanical connection with the stripping zone and a reactor standpipe inlet; wherein the transition zone comprises a sparger assembly located at a separation distance, $d_{sep}$, from the reactor standpipe inlet defined by the formula:

$$d_{sep} = K \times (A_{inlet})^{0.5}$$

wherein $d_{sep}$ is the distance (in inches) from the sparger assembly to the reactor standpipe inlet, $A_{inlet}$ is the internal area of the reactor standpipe inlet (in square inches), and K is from about 0.3 to about 1.5.

DESCRIPTION OF THE PREFERRED EMBODIMENTS

Most modern FCC reactors are usually either of the "axial riser" or the "external riser" design, but also may be what herein is termed as an "S riser" design. One embodiment of the present invention is applied to external riser reactor designs, but other embodiments of the present invention include applications in axial riser and "S" riser designs. For clarification purposes, the details of present invention will be described in the embodiment of the external riser designs and will then later described as to how these additional embodiments are applied to axial riser and "S" riser design FCC reactors.

Figure 1:
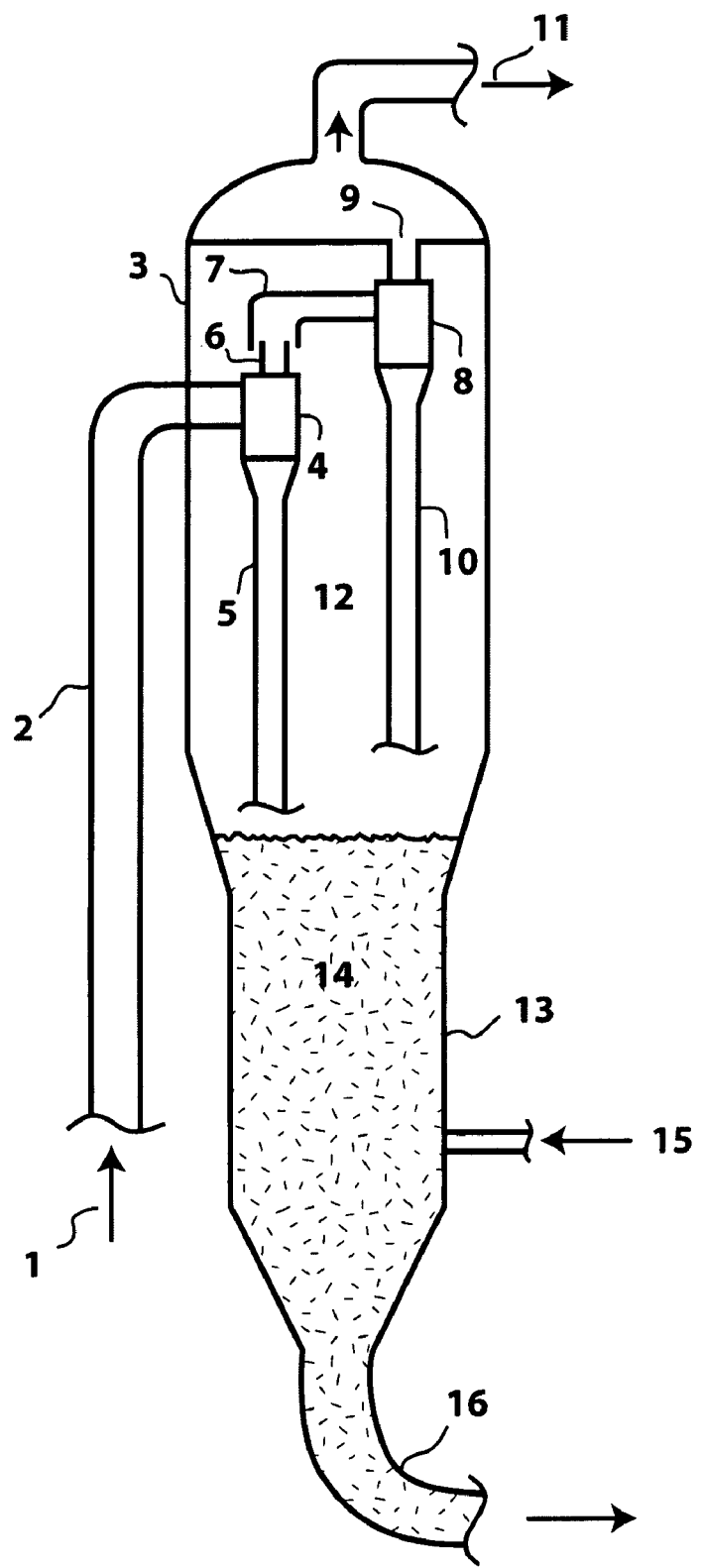
FIG. 1 depicts a simplified illustration of an embodiment of an FCC external riser reactor wherein the reactor riser section is positioned external to the FCC reactor.
Figure 10:
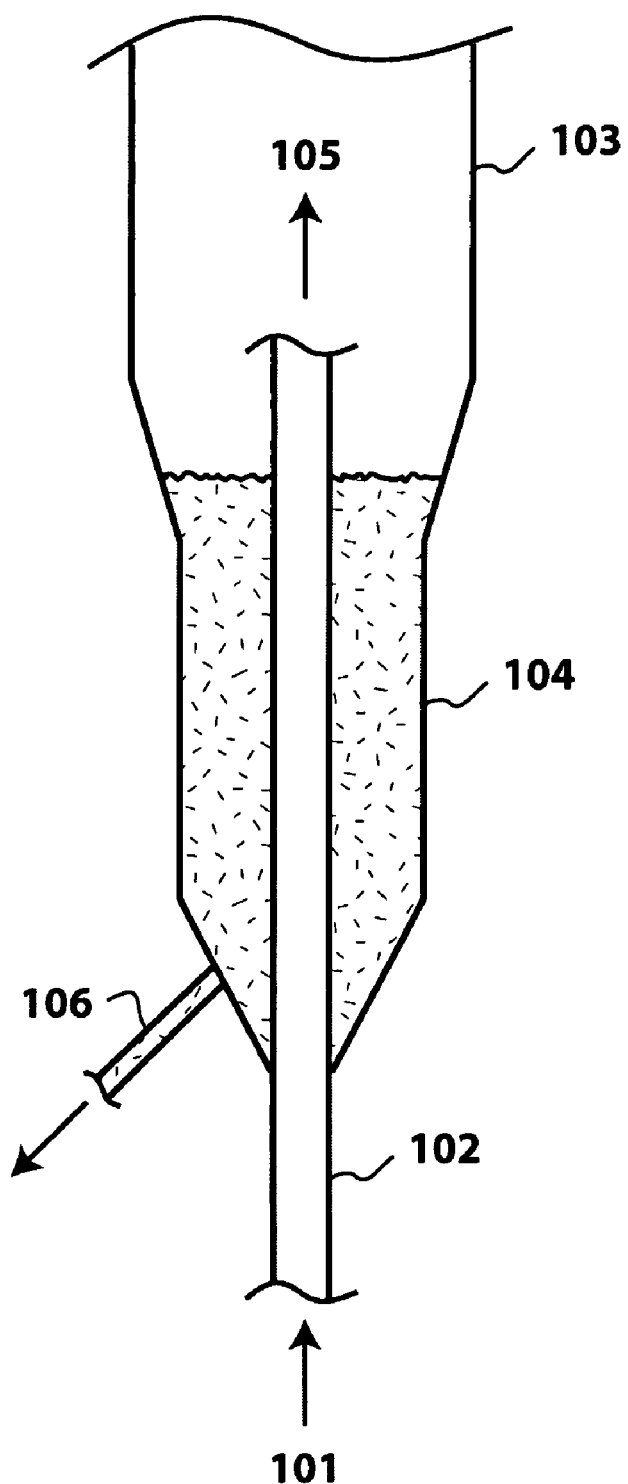
FIG. 10 depicts a simplified illustration of an embodiment of an FCC axial riser reactor wherein the reactor riser enters from the bottom of the FCC reactor and rises axially through the reactor stripper section.

FIG. 1 illustrates a simplified schematic of an FCC reactor with an external riser. In contrast, in an FCC reactor with an axial riser reactor design, the reactor riser enters the FCC reactor axially through the bottom of the reactor, rises through the FCC stripper section of the reactor and terminates in the upper section of the FCC reactor. A basic illustration of an axially designed reactor can be seen in U.S. Pat. Nos. 4,927,606 and 6,248,298. This axial riser design creates an annularly shaped stripper section with the inner wall of the stripper annulus being comprised of the axial riser and the outer wall of the stripper annulus being comprised of the reactor wall. A simplified schematic of an axial riser configuration as it relates to an FCC reactor stripper section is shown in FIG. 10. Due to the configuration of the FCC reactor stripper section many of the axial riser stripper section designs utilize some type of "disk and donut" or other tray design which is generally circular in configuration.

Figure 13:
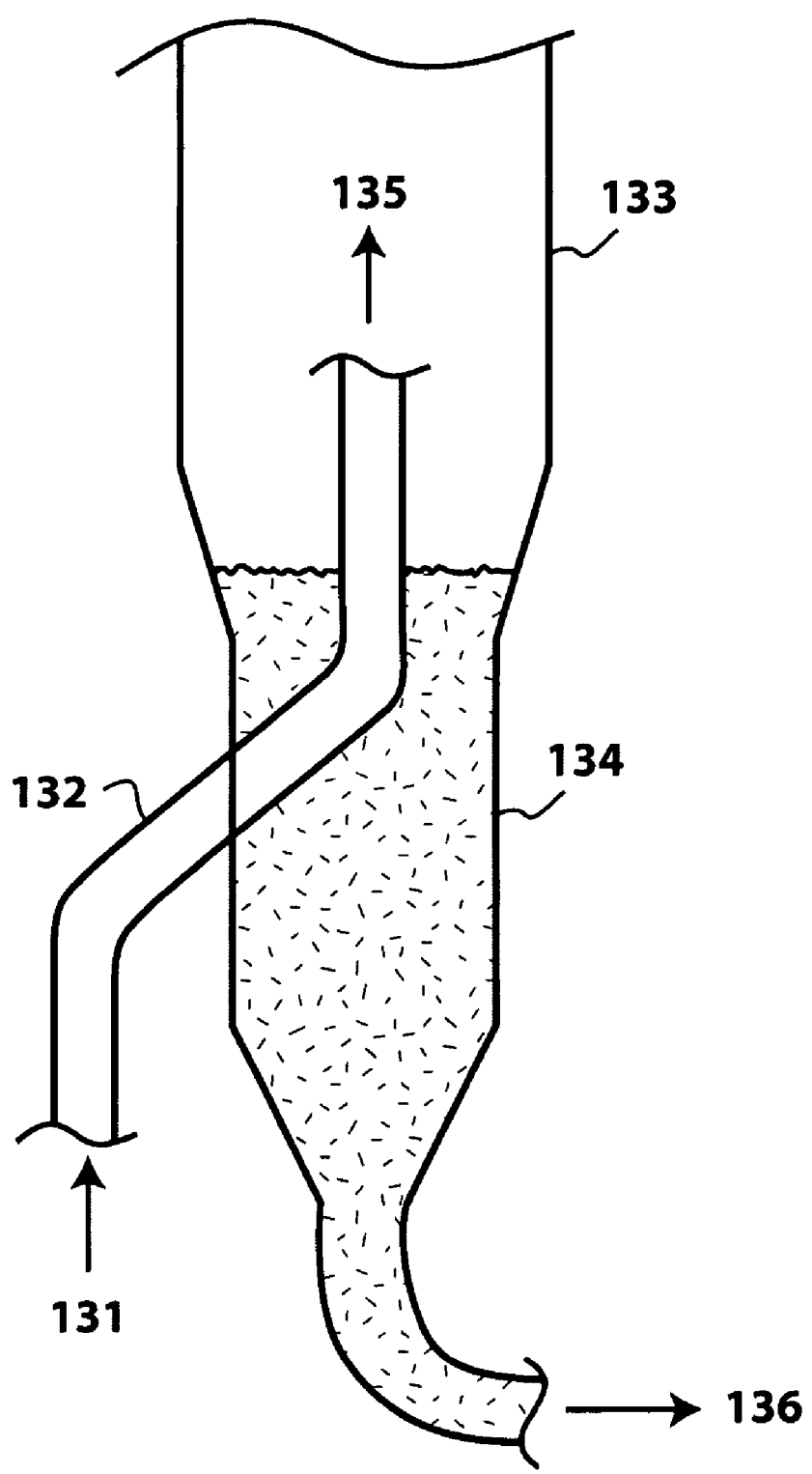
FIG. 13 depicts a simplified illustration of an embodiment of an FCC "S" riser reactor wherein the reactor riser enters in from the side of the FCC reactor in the area of the reactor stripper section and then rises axially through the remainder of the reactor stripper section.

In an "S" riser design, the FCC reactor riser enters the reactor in the stripping section somewhere between the bottom and top row of the stripping trays. As such, the bottom stripping trays, which are below the entry point of the riser into the stripper section, are configured similar to the external riser stripping trays of the present invention. Conversely, in this configuration, the top stripping trays, which are above the entry point of the riser into the stripper section, are configured similar to the axial riser stripping trays of the present invention. A simplified schematic of an "S" riser configuration as it relates to an FCC reactor stripper section is shown in FIG. 13.

The presently claimed invention involves an improved design for the stripper section of an FCC stripper reactor with improved hydrocarbon/spent catalyst separation for FCC reactor designs that can be utilized in a multitude of reactor riser design configurations. The present invention and associated concepts are first discussed in the context of an external riser embodiment. A general illustration of an FCC external riser reactor configuration is shown in FIG. 1. It should be noted that this illustration is for the purposes of generally describing a simplified configuration of only one possible type of FCC external riser reactor design and many details and components are not included in this highly simplified schematic.

In FIG. 1, the hydrocarbon feedstream, regenerated catalyst and optionally fresh catalyst (1) enter the external riser (2) which then enters the FCC reactor (3) usually in the upper section of the reactor. The regenerated catalyst enters the external riser at a temperature from about 1100 to about 1400° F. (593 to 760° C.) and is contacted with the incoming feed to initiate the desired cracking reactions of the hydrocarbon feedstream. Most of the heat required for feed vaporization and the overall endothermic cracking reactions is supplied from the heat of the regenerated catalyst.

In many modern FCC reactors, it is desired for most or preferably substantially all of the cracking reactions of the hydrocarbon feedstream to take place in the riser section. The total riser contact time is usually less than 10 seconds, preferably less than about 5 seconds in duration. The short-contact time (less than about 5 seconds) is generally desired with, but not limited to, zeolite containing catalyst systems. These catalysts are very active in performing the desired cracking reactions which normally occur within about 1 to about 5 seconds after contacting the regenerated catalyst with the incoming hydrocarbon feedstream. Therefore, it is usually desired to separate the catalyst from reaction products as quickly and efficiently as possible after exiting the external riser section of the reactor.

This separation is often performed in cyclone separators which utilize the velocity of the combined stream of catalyst and reaction products and the differential in the masses to separate the spent catalyst from the reaction products. FIG. 1 shows a simplistic configuration where the spent catalyst and the reaction products enter a first stage cyclone (4). In the first stage cyclone the majority of the spent catalyst and the reaction products are separated from each other and a stream primarily comprised of spent catalyst leave the first stage cyclone dipleg (5) and a stream primarily comprised of reaction products with some catalyst fines leaves the first stage cyclone via a conduit (6) and is routed to a second stage cyclone (8). The conduit (6) may contain a slip joint (7) which allows for thermal expansion as well as stripped products and stripping medium from the reactor and/or stripper section to be removed from the reactor. In the second stage cyclone, a similar separation is made to further reduce the catalyst particulate concentration of the separated reaction product stream (9) leaving the second stage cyclone and the catalyst fines removed in the second stage cyclone leave via the second stage cyclone dipleg (10). The separated reaction product stream is then routed for further processing via the reactor overhead line (11).

For purposes of illustration, FIG. 1 only shows one first stage cyclone and one second stage cyclone, however, an external riser reactor will generally have multiple first stage and second stage cyclones in a reactor. It should also be noted that the configuration described above is only one configuration of external riser FCC reactor designs for which the present invention may be utilized. Other reactor designs contemplated for use of the present invention include, but are not limited to, reactor designs in which there is only one cyclone stage or there is more than two cyclone stages, and reactor designs wherein the cyclones are not closed (i.e., the product enters the reactor space (12) prior to entry into a cyclone or between the cyclone stages). Additionally, for the present invention, it does not matter how the initial spent catalyst/reaction product separation is made, although the use of some type of cyclone is the most common design. The present invention is also applicable to FCC reactor designs utilizing more than one reactor riser.

FIG. 1 also illustrates the FCC reactor stripper section (13). The term FCC reactor stripping section may also be referred to herein as "FCC stripper", "reactor stripper", "stripper section", "stripping zone" or "stripper". For simplicity, the FCC reactor stripper section (13) is shown without internal details to illustrate its general relationship to an external riser FCC reactor design. In this section, hydrocarbons remaining on the spent catalyst (14) are stripped from the spent catalyst to be recovered with the reaction products. A stripping medium (15) is normally injected into the stripper section to remove strippable hydrocarbons that remain on the catalyst and increase the recovery reaction products which are removed from the reactor via the reactor overhead line (11). In the reactor stripper, the spent catalyst is "fluidized" and moves down the stripper section where it leaves via the reactor spent catalyst outlet (16) where the stripped spent catalyst is routed to the FCC regenerator section. The present invention involves a new FCC reactor stripper section design and a process utilizing the new stripper design in an FCC reactor.

Figure 2:
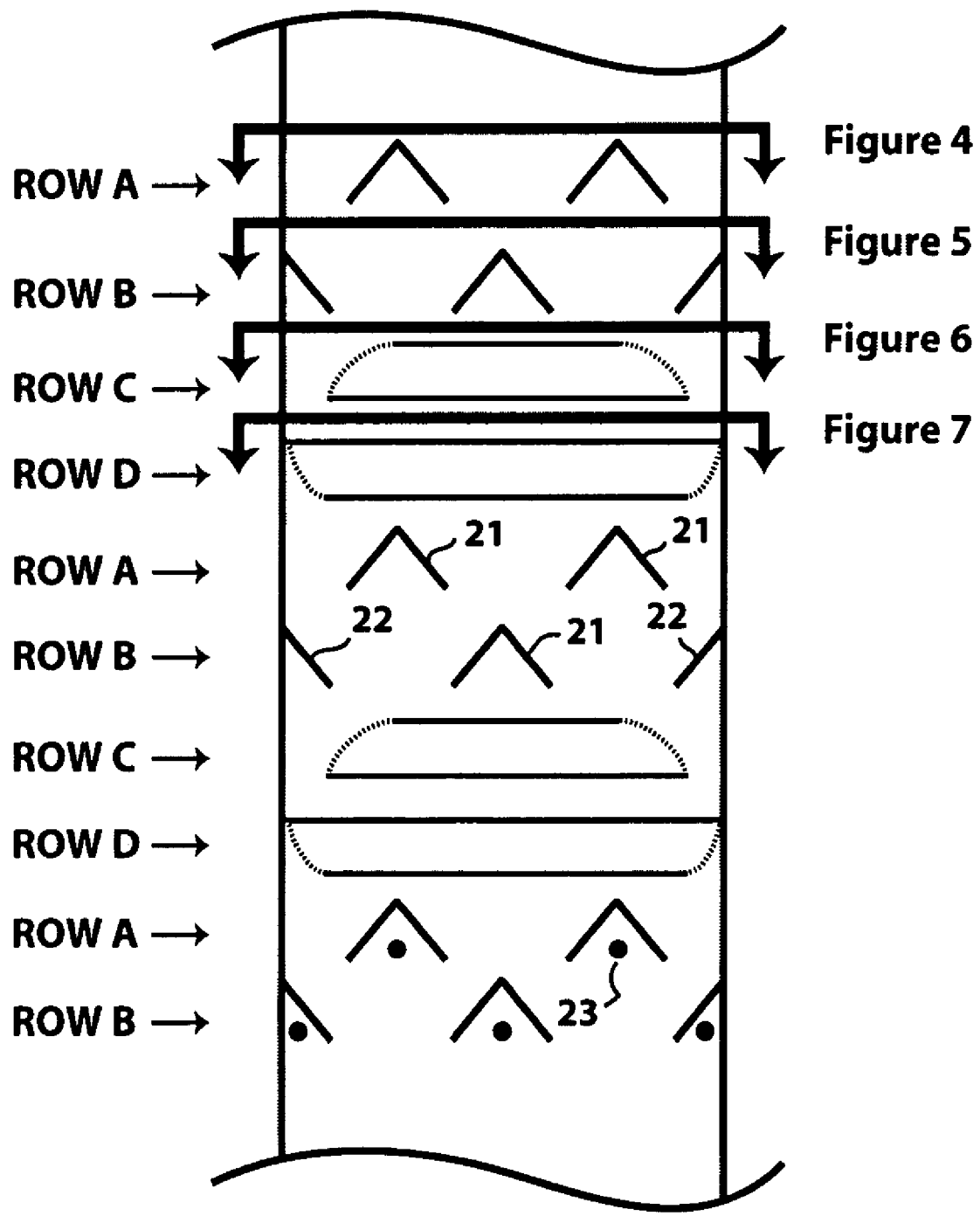
FIG. 2 is an elevation cross-section of one embodiment of an FCC stripper of the present invention, wherein some rows of chordal trays are oriented such that the tray longitudinal axes are at 90° planar angles with respect to the tray longitudinal axes of selected other rows.
Figure 3A:
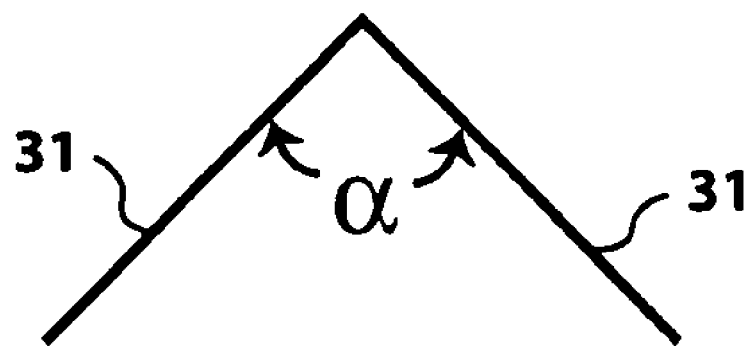
FIG. 3A depicts a cross-section of one embodiment of the chordal trays of the present invention.
Figure 3B:
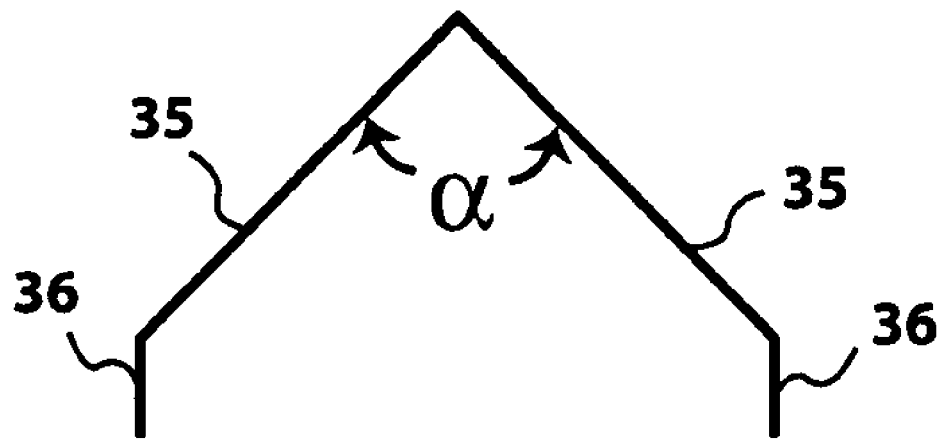
FIG. 3B depicts a cross-section of another embodiment of the chordal trays of the present invention.

One embodiment of the present invention as it applies to an external riser FCC reactor is illustrated in FIG. 2. FIG. 2 shows an elevated cross-section of the stripper section wherein chordal trays are installed in tray rows designated as Rows A through D for illustrative purposes. Here, the tray rows are shown in a repeating pattern of alternating Row A, Row B, Row C, and Row D tray configurations for simplicity purposes. The "internal trays" (21) have an "inverted V" cross-section shape and the "end trays" (22) are comprised of only one-side of the inverted V shape wherein one side of the tray along the longitudinal axis is generally secured to the inside of the wall of the stripper section. In an external riser reactor the internal trays (21) are generally secured on each end of the trays longitudinal axis. This can be better understood by viewing FIG. 5 where the center tray (51) shown is referred to as an internal tray (i.e., the long side of the tray is not connected to the stripper inner wall). Both trays (41) shown in FIG. 4 would also be considered as internal trays. In contrast, the two trays (52) show on each side of the center tray in FIG. 5 are referred to as end trays since one of the longitudinal sides of each tray conforms to and is attached to the stripper inner wall. FIG. 5 also illustrates the longitudinal axis for a tray, which is a common term when used in context to any row of trays in this invention, but is illustrated in only FIG. 5 for simplicity purposes. FIGS. 3A and 3B show typical, but not limiting, elevated cross-sections of preferred chordal tray configurations utilized in this embodiment which will be further defined later herein.

It should be noted here that the term "chordal tray", as used herein, is a tray with a straight configuration viewed in plan (except where one side of the tray is configured for contact with the wall of the reactor). See FIGS. 4 and 5 for an illustration. In addition, all chordal trays in a particular tray row will have parallel tray longitudinal axes that will all be parallel to a common centerline axis of the plan view cross-section of the reactor stripper. This can be best illustrated by viewing FIG. 4 wherein the chordal tray longitudinal axes of Row A all run parallel to the axis labeled 0°. Also, as used herein, the term "planar angle" refers to the angle of rotation in the plan view cross-section of the reactor stripper. This can be best illustrated by viewing FIG. 4 where the planar angles of the stripper are designated to run from 0° to 90° then back to 0°. By way of illustration, in FIG. 4, the planar angle of the chordal tray longitudinal axes are at 0°, while in FIG. 6, the planar angle of the chordal tray longitudinal axes are at 90°.

Returning to the embodiment of the present invention as shown in FIG. 2, the trays in some of the rows, designated as Rows C and D, are oriented with longitudinal tray axes at 90° planar angles from the longitudinal trays axes in other rows, designated as Rows A & B. While it is illustrated that the trays in FIG. 2 are oriented at 90° angles from other rows in the stripper, it is contemplated by and within the scope of this invention that embodiments of tray longitudinal axis orientation for any row may be placed at any angle with respect to tray longitudinal axis orientation for another row and that there may be a multitude of rows at differing angles in a single stripper. A non-limiting example of this would be where rows with four different longitudinal axis are utilized, each at a 45° angle from another corresponding tray row. In a preferred embodiment, the longitudinal axes of the trays in a row are rotated at 0°, 30°, 45°, 60° or 90° planar angles with respect to at least one other tray row in the tower.

Embodiments within the scope of the present invention may include any number of trays per a single row and any number of rows of trays in the stripper section as is physically obtainable. A preferred embodiment would comprise 10 or less trays per row in the stripper section. Another preferred embodiment would include 10 or less rows of trays in the stripper section.

Another embodiment would include stripper designs wherein only the internal configuration trays are utilized. Embodiments within the scope of the invention also do not require that the tray orientations alternate in intervals of every 2 rows as shown in FIG. 2. Each row of trays may be slightly offset so to have three or more consecutive alternating different rows of trays with the same longitudinal axes prior to rotating the following row or rows of trays. It is also within the scope of this invention that a single row may be oriented at a particular planar angle wherein neither preceeding nor following row is at the same planar angle. These preceding and following rows may also be designated herein by the terms "adjoining" or "adjoining rows".

It has unexpectedly been discovered that the orientation of some rows of the trays at different tray longitudinal axes angles from other rows increases the efficiency in the separation of the hydrocarbon from the spent catalyst in the FCC stripper section. This efficiency may be referred to herein as the system's "hydrocarbon/catalyst separation efficiency" or simply "stripping efficiency". Increasing the efficiency of this separation in the FCC stripper section can result in a multitude of benefits such as, but not limited to, increased FCC feed rate, increased product recovery, decreased hydrocarbon losses, decreased emissions, decreased steam usage and decreased energy losses. The configuration of the present invention also improves the stripping efficiency while eliminating or minimizing such detrimental operating effects such as high pressure drop, pluggage, and/or channeling. The present invention is also easy to install, low in maintenance, and provides clear access to the FCC stripper section. This can be of particular importance where the reactor contains internal refractory lining.

FIG. 3A is an elevation cross-sectional illustration of one embodiment of the trays of the present invention. In this embodiment, the tray is comprised of two surface faces (31) that are inclined at an tray internal angle, $\alpha$, wherein, $45° \leq \alpha \leq 150°$, preferably $80° \leq \alpha \leq 120°$. In yet another embodiment as shown in FIG. 3B, the tray is comprised of two surface faces (35) that are inclined at an tray internal angle, $\alpha$, wherein, $45° \leq \alpha \leq 150°$, preferably $80° \leq \alpha \leq 120°$, similar to FIG. 3A; however, the tray embodied in FIG. 3B also encompasses a lip (36) on the bottom end of each tray surface face. The concepts of the proceeding internal angles and lips as shown in FIGS. 3A and 3B also apply to the end trays of the stripper section design when they are utilized in an embodiment.

Figure 4:
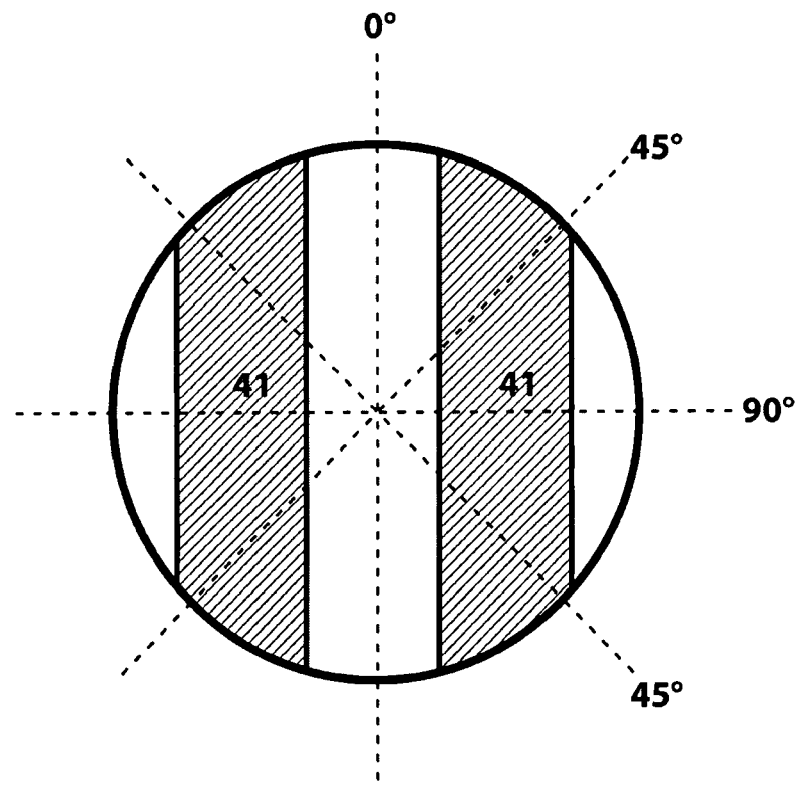
FIG. 4 illustrates a plan view of tray Row A of the stripper configuration as illustrated in the embodiment shown in FIG. 2.
Figure 5:
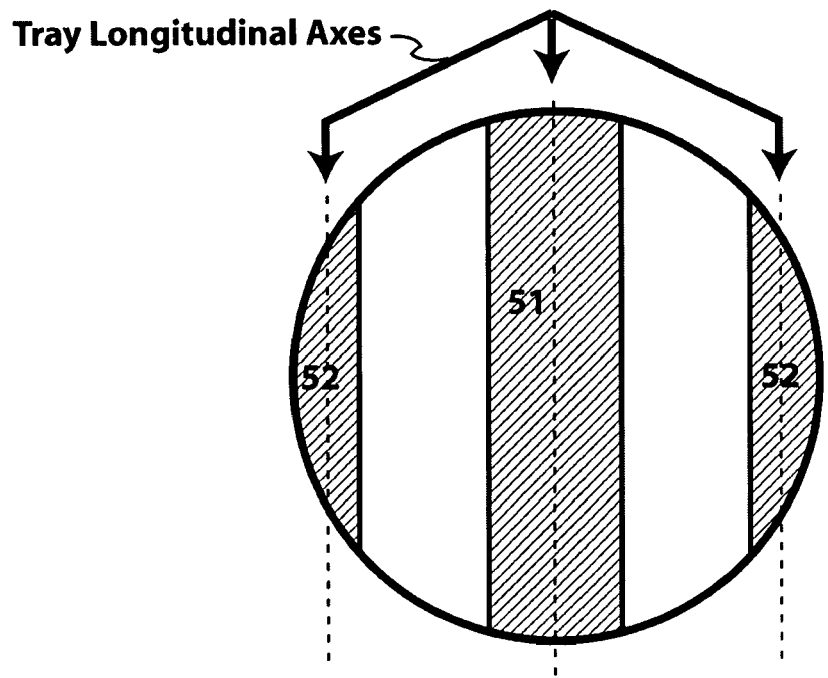
FIG. 5 illustrates a plan view of tray Row B of the stripper configuration as illustrated in the embodiment shown in FIG. 2.

FIG. 4 shows a plan cross-section of tray Row A from FIG. 2. FIG. 4 only illustrates what is referred to as an "internal tray" (41) herein. Although the trays are shown in plan view, crosshatching has been utilized to show the tray area in plan. The area that is not crosshatched is referred herein as the "Tray Row Open Area". FIG. 4 also illustrates the 0°, 45°, and 90° planar angles of the stripper section as utilized herein when referring to the angular orientation of the tray longitudinal axes.

The Tray Row Open Area ("A") is calculated as the plan view internal area of the stripper ("B") less the plan view projected area of the trays in that row ("C"). This can be illustrated in FIG. 4 wherein the plan view internal area of the stripper ("B") is the total calculated area within the circle defining the stripper vessel wall and the projected area of the trays in that row ("C") is the area of the crosshatched trays in FIG. 4. This difference ("A", wherein A=B−C) is the Tray Row Open Area and is shown in FIG. 4 as the non-tray, or non-crosshatched area within the circle defining the stripper vessel wall. It should be noted that the area of the tray is calculated by the projected plan area of the circumference of tray. Stated another way, any holes in the trays are not considered as open area, but are considered as part of the projected area of the trays.

FIG. 5 shows a plan cross-section of tray Row B from FIG. 2. FIG. 5 illustrates the internal tray (51) and the end trays (52) as well as the Tray Row Open Area which is shown in FIG. 5 as the square area calculated from the non-tray area, or non-crosshatched area as shown in the figure. FIG. 5 also illustrates the orientation of the tray longitudinal axes.

Figure 6:
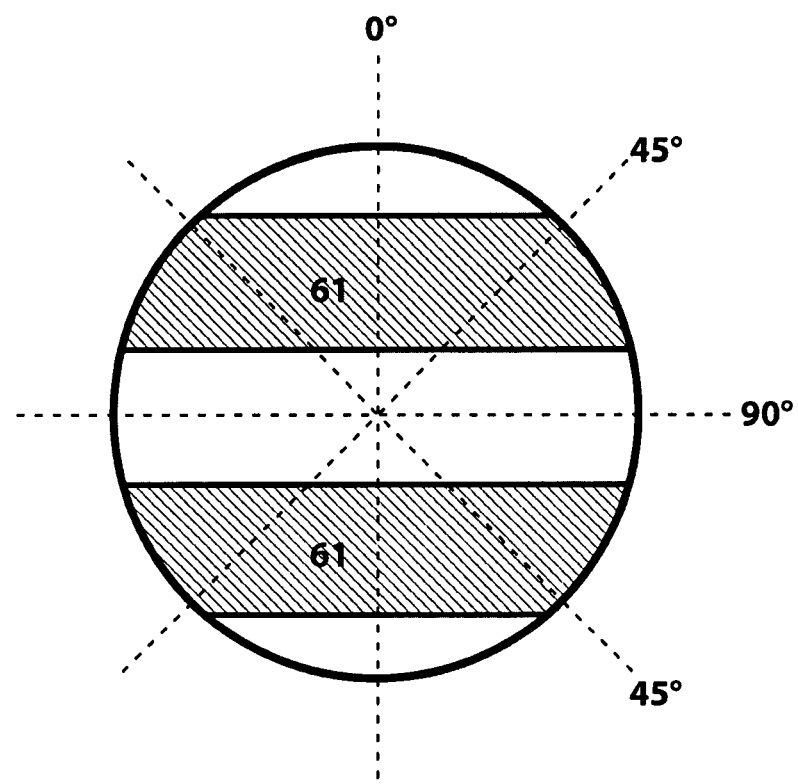
FIG. 6 illustrates a plan view of tray Row C of the stripper configuration as illustrated in the embodiment shown in FIG. 2.

FIG. 6 shows a plan cross-section of tray Row C from FIG. 2 wherein the internal trays (61) are shown. FIG. 6 is similar to FIG. 4 except the tray longitudinal axes in FIG. 6 are oriented at an angle of 90° with respect to the tray longitudinal axes shown in FIGS. 4 and 5. In FIG. 6, the 0°, 45°, and 90° axes of the stripper section are shown with respect to the same stripper section axes as shown in FIG. 4.

Figure 7:
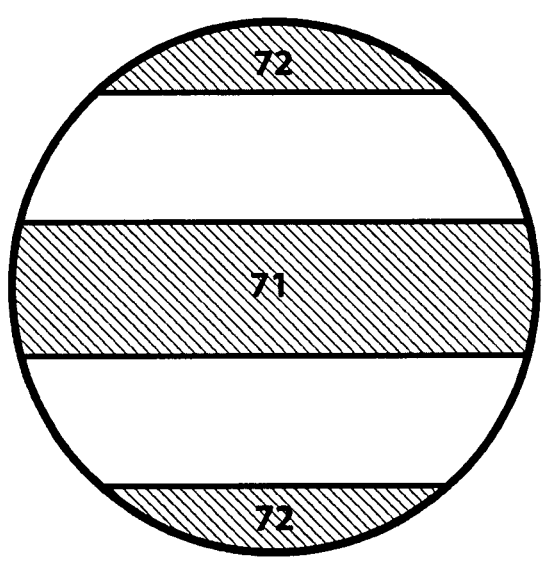
FIG. 7 illustrates a plan view of tray Row D of the stripper configuration as illustrated in the embodiment shown in FIG. 2.

FIG. 7 shows a plan cross-section of tray Row D from FIG. 2 wherein the internal tray (71) and the end trays (72) are shown. FIG. 7 is similar to FIG. 5 except the tray longitudinal axes in FIG. 7 are oriented at an angle of 90° with respect to the tray longitudinal axes shown in FIG. 5.

In a preferred embodiment of the present invention, it has been discovered that the balance of the stripping efficiencies and catalyst flux rates in the FCC stripper section can be improved if the projected open area of the stripper section for each row is within 10%, more preferably within 5%, and most preferably substantially the same as the Mean Tray Row Open Area for all of the tray rows in the stripper section. The Mean Tray Row Open Area is defined as the sum of the Tray Row Open Areas of all of the tray rows in the FCC stripper section divided by the total number of tray rows in the FCC stripper section.

It should be noted that FIG. 2 illustrates just one embodiment of the tray layout for the present invention. It is within the scope of the present invention that embodiments include any number of trays per row, any number of rows, and stripper designs wherein only the internal configuration trays are utilized. Embodiments within the scope of the invention also do not require that the same tray configuration alternate every other row. Each row of trays may be slightly offset so to have three or more consecutive rows of chordal trays with the same longitudinal axes wherein the tray layout is not the same for any of the three or more consecutive rows. It is also within the scope of this invention that the tray longitudinal axis of a single row may be oriented at a particular planar angle wherein neither adjoining row, i.e. neither the tray row above nor the tray row below the subject tray row, is oriented at the same longitudinal angle. In a preferred embodiment the Tray Row Open Area of every row in the stripper section is within 10%, more preferably within 5%, and most preferably substantially the same as the Mean Tray Row Open Area for all of the rows in the stripper section regardless of the number of trays per row or the orientation of the trays.

Stripping medium distributors may be installed under some or all of the stripper section trays. FIG. 2 shows an embodiment wherein in stripping medium distributors (23) are installed under the trays of the bottom two rows of the stripper section. In a preferred embodiment, the stripping medium distributors are installed only under the bottom row of trays in the stripper section. In another preferred embodiment, the stripping medium distributors are installed only under each row of trays starting from the bottom row through the tray row prior to a repeated row or a row with a different longitudinal axis angle. That is, for example, wherein three different tray row configurations are utilized in alternating configurations designated A-B-C-A-B-C starting from the bottom of the stripper section, then distributors are placed under only the bottom most rows of tray configurations A, B, & C. In a preferred embodiment, the stripping medium is comprised of steam.

Figure 8:
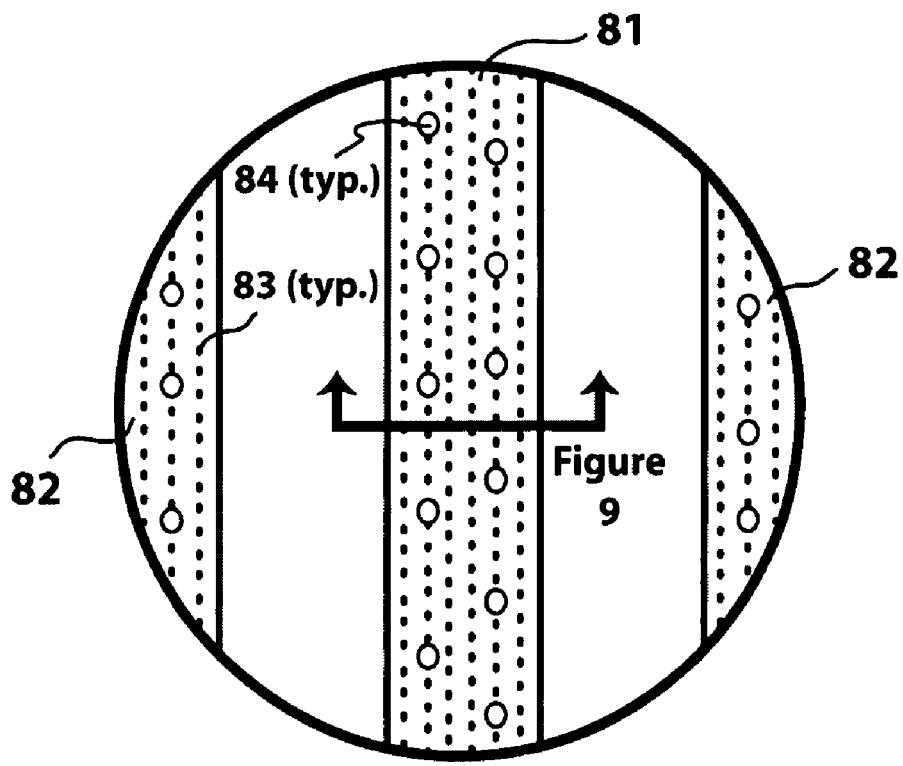
FIG. 8 illustrates a plan view of a typical tray of a preferred stripper tray configuration of the present invention wherein the tray holes and/or flux tubes are incorporated into the chordal tray design.

FIG. 8 illustrates another preferred embodiment of the present invention. Here the internal trays (81) and/or the end trays (82) contain holes (83) in the tray surface faces. It is preferred that the holes be located in one or more rows running parallel with the longitudinal axis of the tray. In a preferred embodiment the holes are from about 0.5 to about 4.0 inches in diameter, more preferably from about 0.75 to about 1.5 inches in diameter. These holes help to redistribute the flow of the stripping medium and improve contact between the stripping medium and the spent catalyst.

FIG. 8 illustrates another preferred embodiment of the present invention. Here the internal trays (81) and/or the end trays (82) contain flux tubes (84) through the tray surface faces. The flux tubes are sections of hollow tubes which are open at both ends. These flux tubes allow some of the volume of the stripping medium to rise through sections of the tray surfaces and some volume of the spent catalyst to fall downward from the elevated face of the shed trays thereby improving overall mass transport in the stripper section with some benefits of improved catalyst/stripping medium contact.

Figure 9:
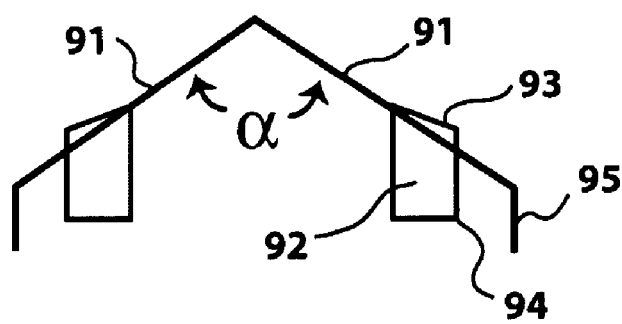
FIG. 9 depicts an elevated cross-section of a preferred embodiment of the chordal trays of the present invention as illustrated in FIG. 8, showing the cross sectional detail of the flux tubes with respect to the chordal tray surfaces and lips.

FIG. 9 shows the elevation details of a typical flux tube and internal tray arrangement embodied in the present invention. Here, the tray has two surfaces (91) that are at an tray internal angle of a with respect to each other wherein angle, $\alpha$, is such that: $45° \leq \alpha \leq 150°$, preferably $80° \leq \alpha \leq 120°$. FIG. 9 shows the flux tubes (92) which penetrate the tray surface (91) and extend below the tray surface. The top of the flux tube (93) may be flush with tray surface or in a preferred embodiment, may be flush with the tray surface at on the uphill side of the flux tube and fall at less of an angle than the tray surface to allow the downhill side of the flux tube to extend above the tray surface as shown in FIG. 9. This latter configuration helps improve catalyst to stripping medium contact and thereby improving overall stripping efficiencies.

Continuing with FIG. 9, it is preferred that the bottom of the flux tube (94) be cut so that the bottom face is horizontal. When flux tubes are utilized, it is preferred, but not required, that the tray have a lip (95). The bottom of the flux tube (94) may be flush with the bottom edge of the tray lip (95) or the bottom of the flux tube (94) may terminate above or below the bottom edge of the tray lip (95). In a preferred embodiment, the bottom of the flux tube (94) will terminate above the bottom edge of the tray lip (95).

It is preferred that the flux tubes have internal diameters from about 4 to about 16 inches in diameter, more preferably from about 6 to about 10 inches in diameter. It is also within the scope of the present invention that the tray holes and/or flux tubes can be installed in the stripper tray configuration shown in FIG. 2 and all configurations expounded therefrom and described herein.

As noted earlier, the present invention may also be applied to axial riser and "S" riser FCC reactor configuration. FIG. 10 is a greatly simplified drawing illustrating only the orientation of an axial riser with respect to a stripper section of an FCC reactor. The stripper section internals have been left out for clarity. Here, the hydrocarbon feedstream, regenerated catalyst and optionally fresh catalyst (101) enter the axial riser (102) which then enters the FCC reactor (103) axially through the bottom of the reactor and rises through the stripper section (104) and the riser terminates in various configurations known in the art in the upper section (105) of reactor. To accommodate the axial riser, the spent catalyst removal line (106) is normally moved off the vertical centerline of the rector as shown.

Figure 11:
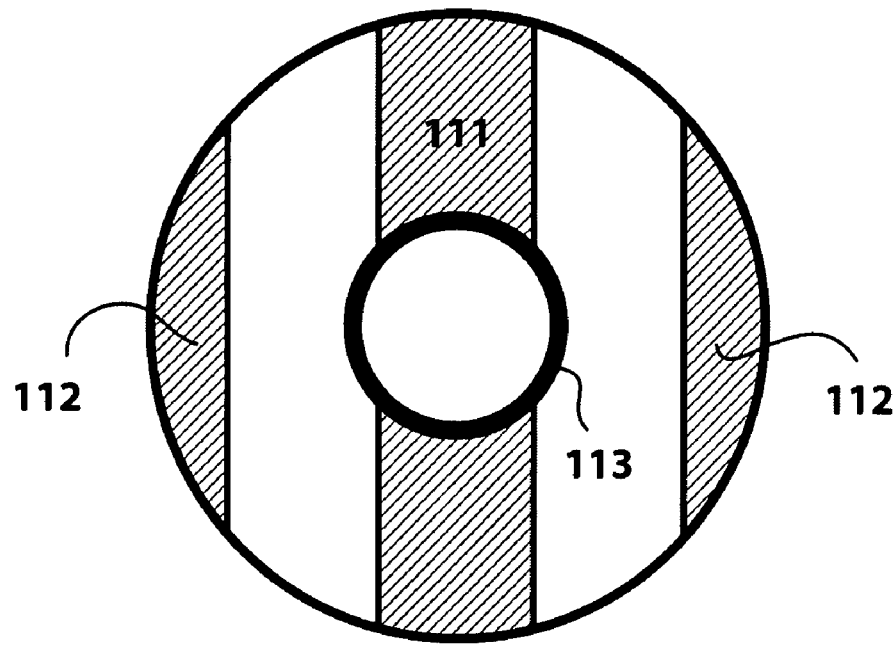
FIG. 11 illustrates a plan view of one tray configuration of an embodiment of the present invention as utilized in an FCC axial riser reactor or an FCC "S" riser reactor.
Figure 12:
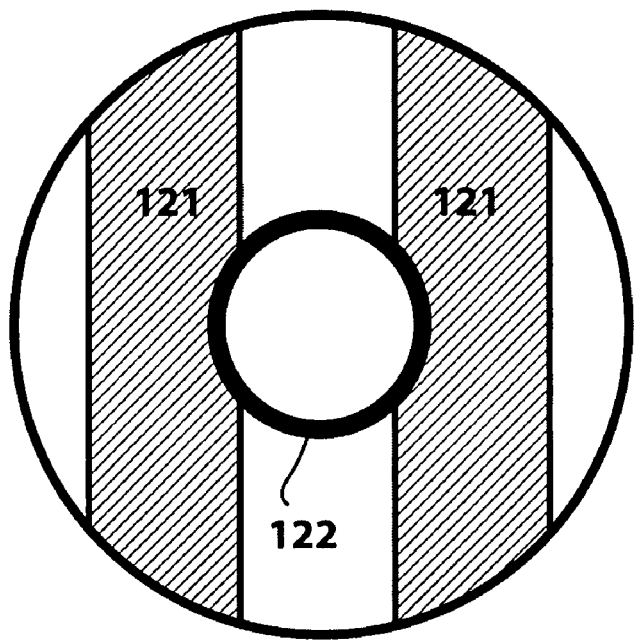
FIG. 12 illustrates a plan view of a corresponding tray configuration of an embodiment of the present invention as utilized in an FCC axial riser reactor or an FCC "S" riser reactor.

As can be seen in FIG. 10, the internal cross-section of the stripper section is not fully open to catalyst flow as is the case for the external riser design. In the axial riser design, the stripper cross-section is interposed with the circular cross-section of the axial riser leaving an annular spacing for the catalyst flow in the stripper section. As a result, the stripper design of the present invention for the axial design reactors is modified to accommodate the axial riser as shown in FIGS. 11 and 12. FIG. 11 shows a planar cross-section of the present embodiment as applied to an axial riser FCC reactor design. As can be seen the portion of chordal tray(s) that would intersect the area encompassed by the axial riser (113) are eliminated and the chordal tray(s) are coped to conform to the external wall of the axial riser. FIG. 11 again illustrates the internal tray(s) (111) and the end trays (112). FIG. 12 further illustrates an accompanying tray level, again showing the configuration of the axial riser (122) and the internal trays (121).

All embodiments and configurations of the present invention as exemplified above in the external riser design FCC reactors also apply to an FCC axial riser reactor design.

FIG. 13 is a greatly simplified drawing illustrating only the orientation of an "S" riser with respect to a stripper section of an FCC reactor. Again, the stripper section internals have been left out for clarity. Here, the hydrocarbon feedstream, regenerated catalyst and optionally fresh catalyst (131) enter the axial riser (132) which then enters the FCC reactor (133) through the side of the reactor stripper section (134) and the riser terminates in various configurations known in the art in the upper section (135) of reactor. In an "S" riser design, the FCC reactor riser enters the reactor in the stripping section somewhere between the bottom and top rows of the stripping trays. As such, the bottom stripping trays which are below the entry point of the riser into the stripper section are configured similar to the external riser stripping trays of the present invention, whereas the top stripping trays which are above the entry point of the riser into the stripper section are configured similar to the axial riser stripping trays of the present invention. A spent catalyst removal line (136) is located near the bottom of the reactor stripper to allow for spent catalyst removal from the FCC reactor.

It should be understood that the stripping section of the present invention in an "S" riser design will utilize a combination of tray configurations as illustrated in FIGS. 4-7, 11 and 12, depending on whether or not the riser is axially intersecting a particular row in the stripper section. All embodiments and configurations of the present invention as exemplified above in the external riser design and the axial riser design FCC reactors also apply to an FCC "S" riser reactor design.

In a conventional FCC reactor, the flow of the catalyst from the stripper sheds enters a transition zone of the reactor. This transition zone is most commonly in the shape of a conical section which transitions the flow of catalyst leaving the stripper area containing the stripper trays to the inlet of a catalyst standpipe. The catalysts standpipe is utilized to transfer the spent catalyst leaving the FCC reactor and the reactor's stripping section to the FCC regenerator wherein the spent catalyst is subjected to air and temperatures sufficient to combust at least a portion of the volatile hydrocarbons and coke from the spent catalyst resulting in a regenerated FCC catalyst. The regenerated catalyst can then be returned to the FCC reactor feed zone for further catalytic processing of the FCC feedstream.

Figure 16:
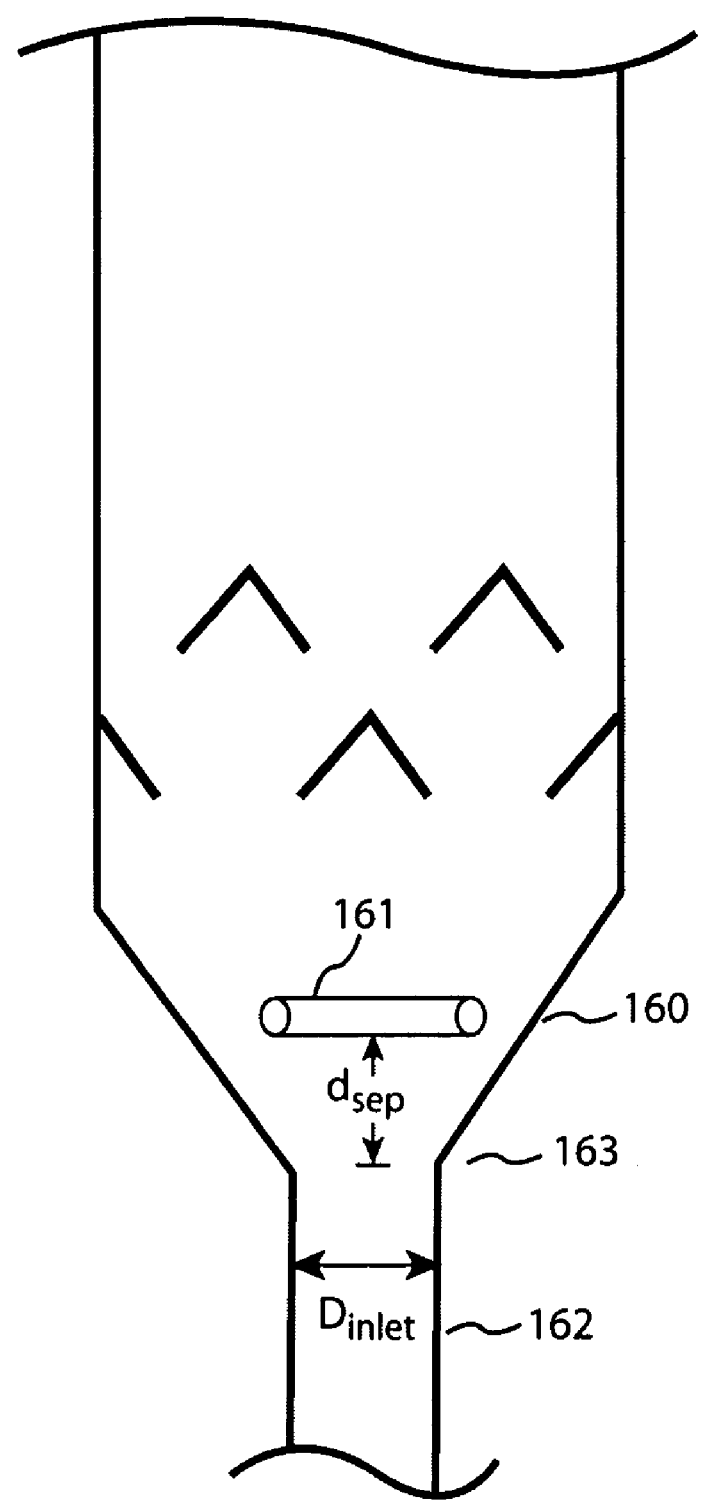
FIG. 16 is an elevation cross-section of one embodiment of an FCC reactor of the present invention, wherein a sparger assembly is located in the transition zone of the FCC reactor at an optimal distance, $d_{sep}$, from the reactor standpipe inlet.

FIG. 16 illustrates a preferred embodiment of the current invention, wherein the transition zone (160) comprises a sparger assembly (161). The sparger assembly is utilized to disperse a stream comprised of steam, an inert gas, or a combination thereof into the transition zone. The primary function of this sparger assembly is to adequately fluidize the flow of catalyst moving through the transition zone to properly maintain a stable catalyst flux to the reactor standpipe inlet although some stripping of volatile hydrocarbons may also occur in this region. This sparger assembly can be in the configuration of a sparger ring as shown in cross-section view as element (161) in FIG. 16, or it can be in any form suitable for dispersing a gas or vapor stream into the spent catalyst including configurations such as, but not limited to, a sparger ring, pipe sparger(s) located inside the transition zone, sparging grid(s) comprised of interconnecting pipe spargers, sparging nozzles located on the periphery walls of the transition zone, or any combination thereof. Preferably, the sparger is in the shape of a ring. Even more preferably, the sparger is in the shape of a ring wherein the plane of the ring is perpendicular to the vertical axis of the FCC reactor transition zone and the center axis of the sparger ring and the vertical axis of the FCC reactor transition zone are the same.

The FCC reactor standpipe (162) is utilized to transfer the spent catalyst leaving the FCC reactor to the FCC regenerator. The inlet of the FCC reactor standpipe is defined as the point where the conical section of the FCC reactor transition zone intersects with the circular section of the reactor standpipe. The point that defines the FCC reactor standpipe inlet is shown as the transition point (163) in FIG. 16. The separation distance, "$d_{sep}$", is defined as the distance between the sparger assembly and the FCC reactor standpipe inlet. The separation distance "$d_{sep}$", is shown in FIG. 16. It has been discovered an optimum distance between the sparger assembly and the FCC reactor standpipe inlet and is dependent upon the desired catalyst flux rate and the internal area of the FCC reactor standpipe inlet, "$A_{inlet}$". If the separation distance "$d_{sep}$" is too small, the fluidization of the catalyst in the transition zone near the reactor standpipe inlet will be too high and maximum flux rates will not be achieved due to the loss of optimum catalyst fluidization in the transition zone and loss of catalyst flow in the standpipe at the higher flux rates. Conversely, if the separation distance, "$d_{sep}$", is too high, maximum flux rates will not be achieved due to incomplete catalyst fluidization in the lower portion of the transition zone, thus retarding catalyst flow and the loss of catalyst flow in the standpipe at the higher flux rates.

Figure 17:
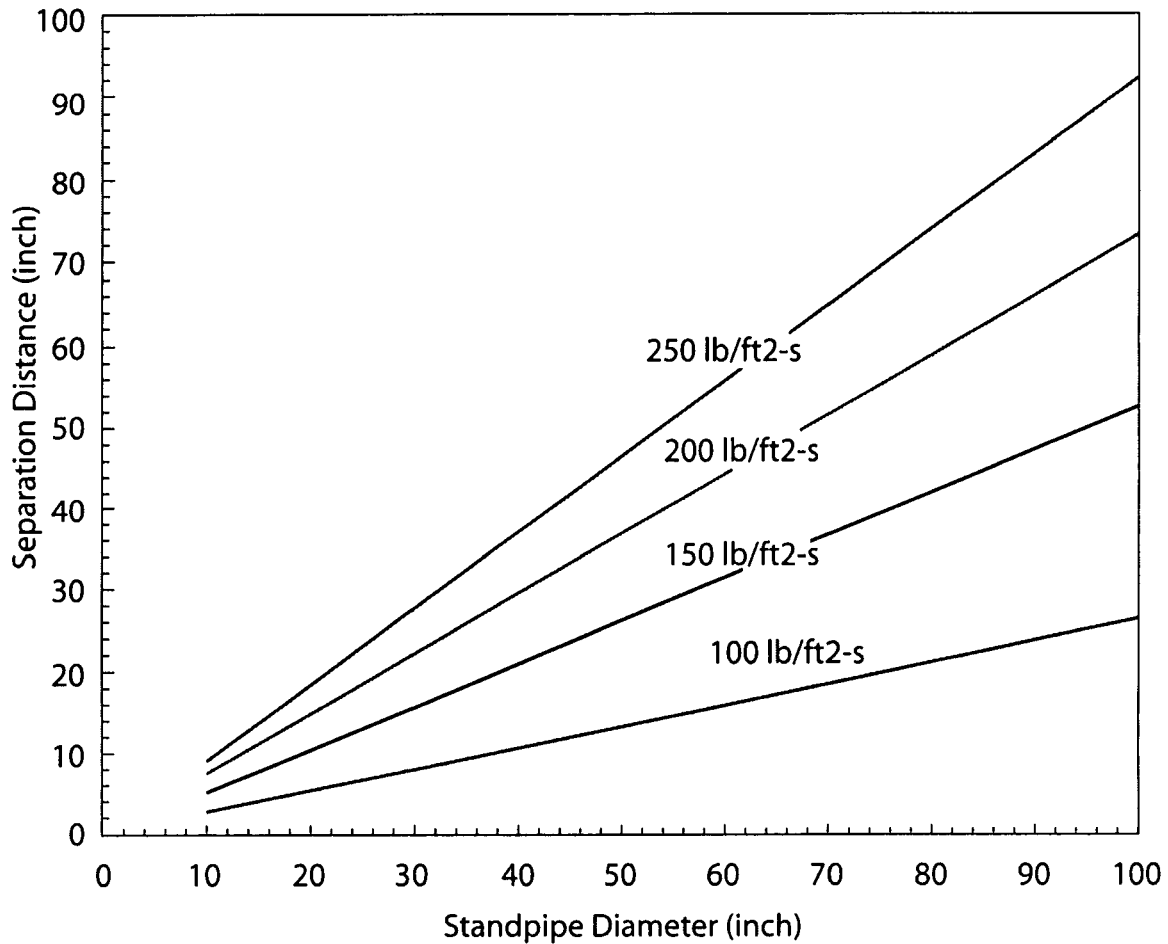
FIG. 17 is a graph showing the optimal distance for locating the sparger assembly from the reactor standpipe inlet at various standpipe flux rates.

For stable standpipe catalyst flux rates of about 100 lb/ft$^2$*sec to flux rates of about 350 lb/ft$^2$*sec, more preferably for standpipe catalyst flux rates of about 100 lb/ft$^2$*sec to flux rates of about 250 lb/ft$^2$*sec, it has been discovered that the relationship between the optimum separation distance "$d_{sep}$" and the diameter of the FCC reactor standpipe inlet "$D_{inlet}$" is shown in FIG. 17. For a circular cross-sectional standpipe, the diameter of the standpipe inlet "$D_{inlet}$" (in inches) and the area of the standpipe inlet "$A_{inlet}$" (in square inches) are related by the geometric formula shown in Equation 1:

$$A_{inlet}=(D_{inlet})^2 \times (\pi/2) \quad [1]$$

It should be noted that this relationship between the optimum separation distance, "$d_{sep}$", and the area of the FCC reactor standpipe inlet, "$A_{inlet}$", exists whether the cross-section of the standpipe inlet is circular or non-circular, for example, but not limited to the case wherein the cross-section of the standpipe inlet of a square, rectangle, or an ellipse. Therefore, this relationship between the optimum separation distance "$d_{sep}$" (in inches) and the area of the FCC reactor standpipe inlet "$A_{inlet}$" (in square inches) can be reduced to Equation 2:

$$d_{sep}=K \times (A_{inlet})^{0.5} \quad [2]$$

wherein K is from about 0.3 to about 1.5, and more preferably from about 0.3 to about 1.1.

In a preferred embodiment the relationship between optimum separation distance "$d_{sep}$" and the area of the FCC reactor standpipe inlet "$A_{inlet}$" is utilized for FCC reactor standpipe wherein internal area of the FCC reactor standpipe is from about 110 in$^2$ to about 7200 in$^2$. More preferably the internal area of the FCC reactor standpipe is from about 450 in$^2$ to about 4000 in$^2$.

It should also be noted that preferred embodiments, including the sparger assembly located as defined by the equation above, can be utilized in any FCC reactor configuration as disclosed herein. In an FCC reactor comprising more than one reactor standpipe, the area of the reactor standpipe inlet, $A_{inlet}$, for determining $d_{sep}$ is defined as the internal cross-sectional area of only a single reactor standpipe and the catalyst flux rate utilized is that of a single reactor standpipe.

In a particular embodiment, the present invention is utilized in a conventional FCC process wherein petroleum feed is injected into the reaction zone in the riser containing a bed of fluidized cracking catalyst particles. The catalyst particles typically contain zeolites and may be fresh catalyst particles, catalyst particles from a catalyst regenerator or some combination thereof. Gases that may be inert gases, hydrocarbon vapors, steam or some combination thereof are normally employed as lift gases to assist in fluidizing the hot catalyst particles.

In this process, the catalyst particles contact the FCC to feed produce product vapors and catalyst particles containing strippable hydrocarbons as well as coke. These vapors and catalyst particles are passed to a separation zone for separating the product vapors from the spent catalyst particles. This section of the process may employ any separation methods or devices known in the art, but preferably will employ separation devices such as cyclones. The catalyst exits the reaction and separation zones as spent catalyst particles containing strippable hydrocarbons and enters the stripper section of the FCC reactor comprising at least one the embodiments of the stripper section as described herein.

In the present invention, chordal tray rows are oriented at varying planar angles in order to modify the flow of the catalyst and redirect the general flow of the catalyst at different planar shedding angles as the catalyst moves down through the various rows of chordal trays in the FCC reactor stripper. The planar shedding angle of the catalyst flow is the planar angle for a particular row at which the catalyst tends to flow when leaving the chordal trays in a particular row. The planar shedding angle for a particular row of chordal trays is the planar angle formed by a line running perpendicular to the tray longitudinal axes in a particular row and intersecting the center of the stripper section. This can be illustrated by viewing FIG. 4. In FIG. 4, the planar angle of the chordal trays is shown by the 0° axis; that is to say, that the trays longitudinal axes are parallel with the centerline planar angle designated as 0° in FIG. 4. Therefore, viewing FIG. 4, the planar shedding angle of the catalyst flow would be 90° which defines a line perpendicular of the tray longitudinal axes running through the center of the reactor stripper. This is the direction, or more accurately, the angle at which the catalyst will tend to depart from contact with the chordal trays in the row. By varying these planar shedding angles, stripping efficiencies can be increased, resulting in an improved FCC stripping process.

In one embodiment of the present invention the process includes an FCC process comprised of contacting a hydrocarbon feed with regenerated catalyst in an external riser of a fluid catalytic cracking reactor; separating a cracked product from the spent catalyst in a reactor separation zone; passing the spent catalyst containing hydrocarbons from the reactor separation zone to the inlet of a reactor stripper section comprised of chordal trays; altering the planar shedding angle of the spent catalyst flow of one or more chordal tray rows in the reactor stripper section with respect to the planar shedding angle of at least one or more chordal tray rows in the reactor stripper section; contacting the spent catalyst with a stripping medium in the reactor stripper section; stripping of at least a portion of the hydrocarbons from the spent catalyst in the reactor stripper section; and removing a stripped spent catalyst from the reactor stripper section.

In a preferred embodiment, the planar shedding angle for each row of trays is selected from 0°, 30°, 45°, 60° and 90°. In another preferred embodiment, the planar shedding angle for each row of trays is selected from 0°, 45°, and 90°, and in yet another preferred embodiment, the planar shedding angle for each row of trays is selected from 0° and 90°.

Spent catalyst particles are typically stripped of strippable hydrocarbons in the FCC stripping section using a stripping medium such as steam. The stripped catalyst particles are then sent to a regeneration zone in which any remaining hydrocarbons and coke is removed via a combustion reaction. In the regeneration zone, coked catalyst particles are contacted with an oxidizing medium, usually air, and remaining hydrocarbons and coke on the catalyst is oxidized (burned) at high temperatures such as 1100° F. to 1400° F. (593 to 760° C.). The regenerated catalyst particles are then passed back into the riser reactor.

Suitable hydrocarbon feeds for the catalytic cracking process described herein include natural and synthetic hydrocarbonaceous oils boiling in the range of about 430° F. to about 1050° F. (221 to 566° C.), such as gas oil; heavy hydrocarbonaceous oils comprising materials boiling above 1050° F. (566° C.); heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, naphtha, and mixtures thereof.

FCC catalysts may be amorphous, e.g., silica-alumina, crystalline, e.g., molecular sieves including zeolites, or mixtures thereof. A preferred catalyst particle comprises (a) an amorphous, porous solid acid matrix, such as alumina, silica-alumina, silica-magnesia, silica-zirconia, silica-thoria, silica-beryllia, silica-titania, silica-alumina-rare earth and the like; and (b) a zeolite. The matrix can comprise ternary compositions, such as silica-alumina-thoria, silica-alumina-zirconia, magnesia and silica-magnesia-zirconia. Silica-alumina is particularly preferred for the matrix, and can contain about 10 to 60 wt. % alumina. Promoters can also be added.

The amount of zeolite component in the catalyst particle will generally range from about 1 to about 60 wt. %, preferably from about 5 to about 60 wt. %, and more preferably from about 10 to about 50 wt. %, based on the total weight of the catalyst. As discussed, the catalyst is typically in the form of a catalyst particle contained in a composite. The catalyst may include ReY, ReUSY, HY, or any faujasite framework type zeolite. The cracking catalyst may include a medium pore zeolite having a Constraint Index (which is defined in U.S. Pat. No. 4,016,218) of about 1 to about 12. Suitable medium pore zeolites include ZSM-5, ZSM-11, ZSM-12, ZSM-22, ZSM-23, ZSM-35, ZSM-48, ZSM-57, SH-3 and MCM-22, either alone or in combination. Preferably, the medium pore zeolite is ZSM-5.

Preferably, the FCC process will utilize a short-contact time cracking configuration wherein the hydrocarbon feed will contact the cracking catalyst for less than about 10 seconds, preferably less than 5 seconds. The short contact time reaction step can be achieved using any of the known processes.

Short-contact time conditions include riser outlet temperatures from about 900° F. to about 1200° F. (482 to 649° C.), pressures from about 0 to about 100 psig (0 to 690 kPa) and residence times from about 1 to about 5 seconds.

The above description of preferred embodiments is directed to preferred means for carrying out the present invention. Those skilled in the art will recognize that other means that are equally effective could be devised for carrying out the spirit of this invention.

The benefits of embodiments of the present invention are further illustrated by the following examples.

EXAMPLES

The two examples below utilized a test apparatus to simulate an FCC stripping zone to test the stripper configuration of the present invention as compared to a parallel tray arrangement of the prior art (wherein all tray rows have substantially the same planar longitudinal tray axes). The test apparatus consisted of a five-riser test unit consisting of five 8" diameter risers, approximately 65 feet in height, which were each fed by a 6" diameter standpipe. A 6" diameter U-bend was used to transfer solids from the bottom of each standpipe into each riser. All risers fed into one 36" diameter cyclone that contained five tangential inlets. The cyclone was located directly above the 36" diameter solids receiver fluidized bed so that a 16" diameter dipleg discharged into the bed. The dipleg on the cyclone contained a trickle valve to discharge the solids directly into the solids receiver vessel freeboard. This type of dipleg discharge simulates the type of solids discharge in a commercial unit. For the purposes of this testing, the 36" diameter receiving vessel is used to replicate a typical commercial FCC stripping vessel.

In order to measure stripper performance, a non-absorbing helium tracer gas was introduced near the top of the dense bed in the stripper vessel. Thermal conductivity detectors (TCD) sensitive the helium tracer concentration were placed at different elevations in the vessel and traversed radially at each elevation. In this manner radial maldistribution of tracer gas could be accounted for in assigning an appropriately weighted average tracer gas concentration at each elevation. Traversals were also performed in diametric opposition in order to discount maldistribution in the azimuthal coordinate. An additional TCD was located near the entrance of one of the standpipes to measure tracer gas carryunder concentration. Stripping efficiency was defined as the percentage of the helium tracer injected into the stripper that was recovered by the stripping gas; the remainder being tracer gas that was carried under into the standpipe.

Each experiment was performed with FCC catalyst under cold flow operating conditions. The stripper plenum pressure was 15 psig, and the entire unit was operated at a temperature of 70° F. Air representing stripping gas was introduced from a sparger grid near the bottom of the stripping vessel at 0.3, 0.5, and 1.0 ft/s. Solids fluxes in the unit were varied at 6, 12, 25, and 36 lb/ft2/sec for the plain shed geometry, and at 12, 25, and 36 lb/ft2/sec solid flux rates for the cross-hatched geometry.

Example 1

In the first set of tests, the stripping efficiency of the stripping zone was measured at varying superficial stripping gas velocities at a constant solids flux rate of 36 lb/ft2/sec. These tests were performed on both the conventional stripping zone configuration, wherein all of the shed trays were at the same planar angles, and on the stripping zone of the present invention, wherein some rows of trays were oriented at 90° planar angles relative to the other rows of trays in the stripping zone. Both configurations had six rows (elevations) of stripping trays; however, in the representation of the present invention, tray rows 3 and 4 were rotated at a planar angle of 90° with respect to tray rows 1, 2, 5 and 6.

Figure 14:
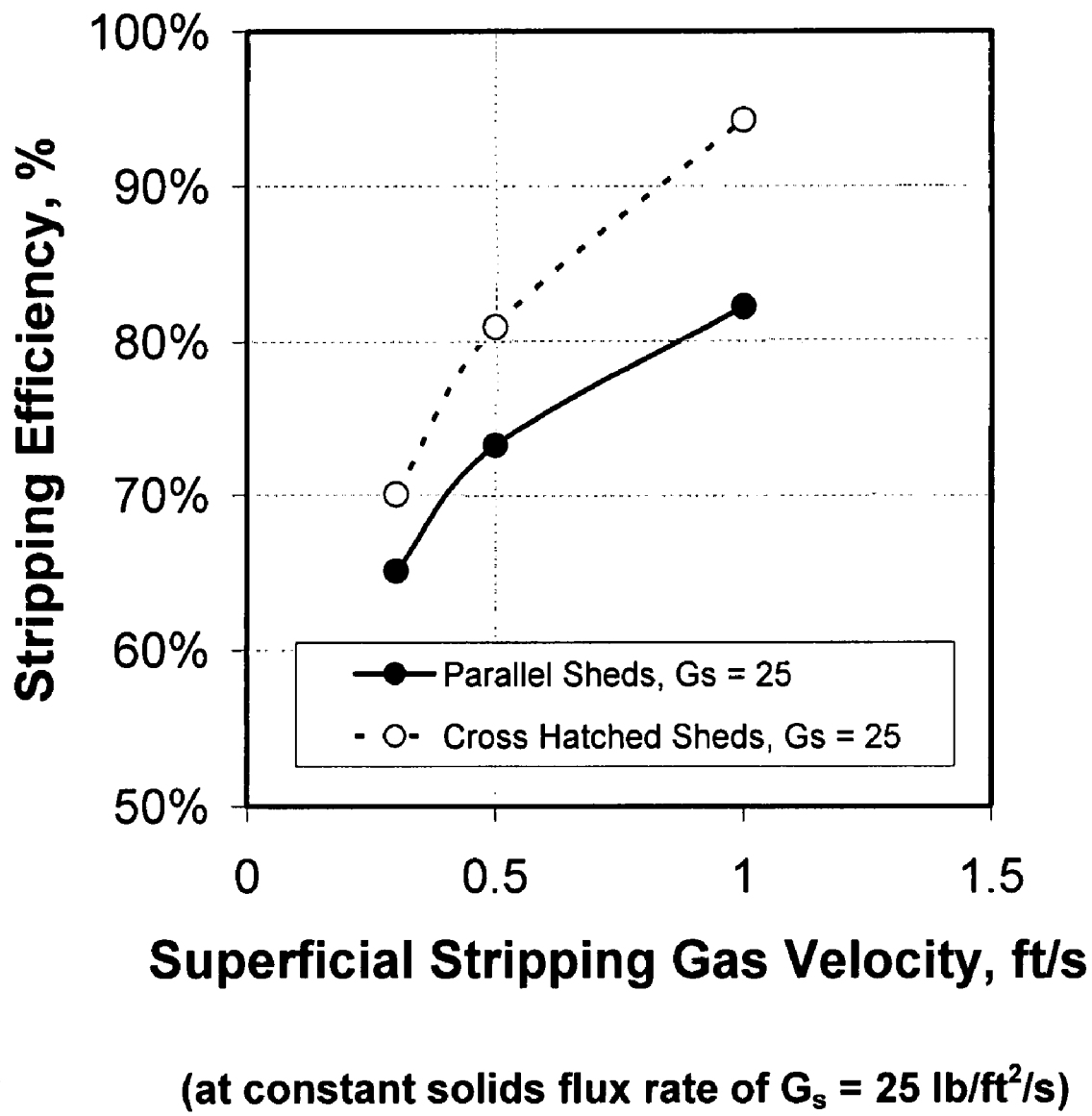
FIG. 14 is a graph comparing the stripping efficiencies of the parallel tray configuration of the prior art with one embodiment of the stripper tray configuration of the present invention as a function of the superficial stripping gas velocities in the stripper zone.

FIG. 14 shows the comparable results of the stripping efficiencies of the parallel tray configuration of the prior art with one embodiment of the tray configuration of the present invention as a function of the superficial stripping gas velocities in the stripper zone. As can be seen, the stripping efficiency of the stripper zone configuration of the present invention is superior to the parallel tray configuration at all stripping gas velocities shown.

Example 2

In the second set of tests, the stripping efficiency of the stripping zone was measured at a varying solids flux rates at a constant superficial stripping gas velocity of 1.0 ft/sec. These tests were performed on both the conventional stripping zone configuration, wherein all of the shed trays were at the same planar angles, and on the stripping zone of the present invention, wherein some rows of trays were oriented at 90° planar angles relative to the other rows of trays in the stripping zone. The same tray configurations as in Example 1 was utilized wherein both configurations had six rows (elevations) of stripping trays; however, in the representation of the present invention, tray rows 3 and 4 were rotated at a planar angle of 90° with respect to tray rows 1, 2, 5 and 6.

Figure 15:
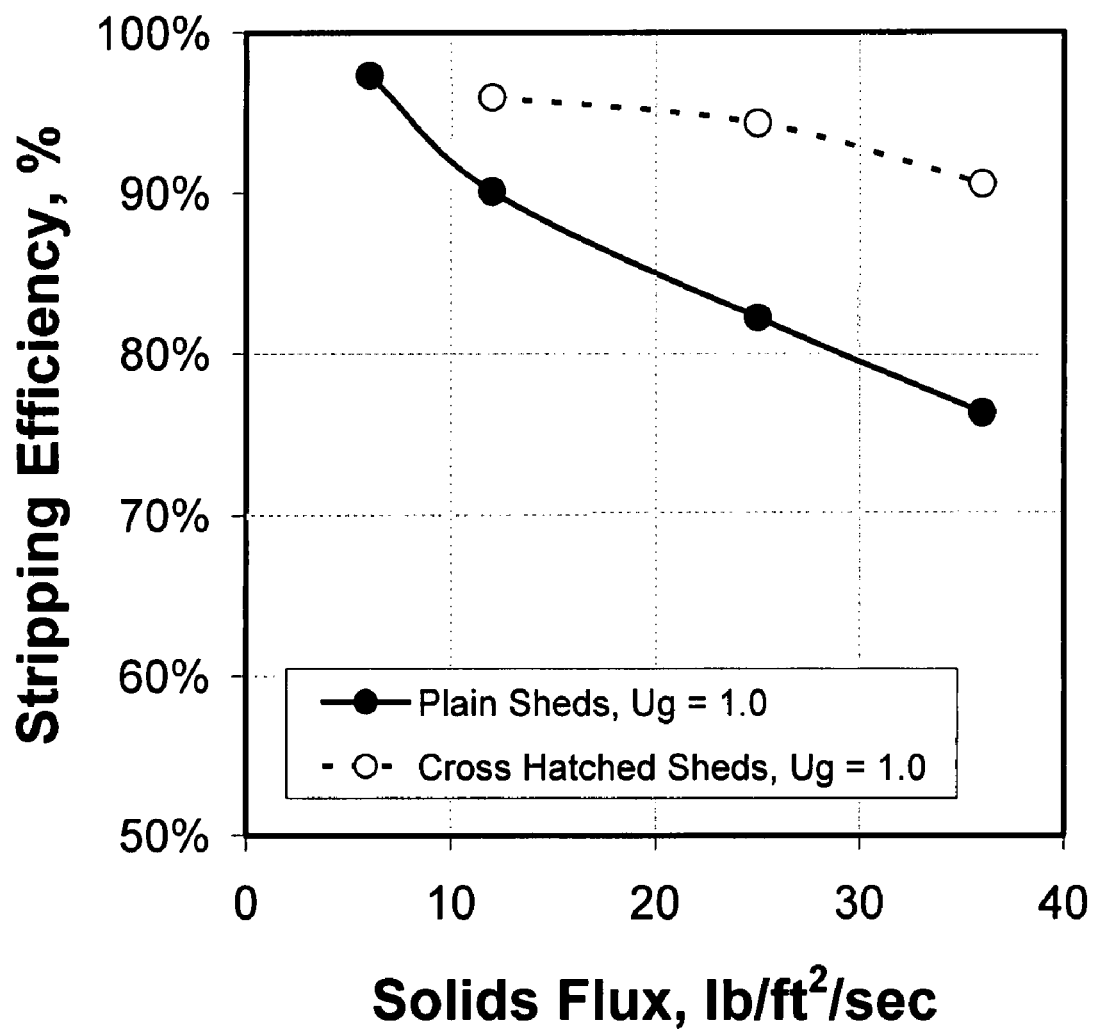
FIG. 15 is a graph comparing shows the stripping efficiencies of the parallel tray configuration of the prior art with one embodiment of the stripper tray configuration of the present invention as a function of the solids flux rates in the stripper zone.

FIG. 15 shows the comparable results of the stripping efficiencies of the parallel tray configuration of the prior art with one embodiment of the tray configuration of the present invention as a function of the solids flux rates in the stripper zone. As can be seen, the stripping efficiency of the stripper zone configuration of the present invention is superior to the parallel tray configuration at all solids flux rates shown.

What is claimed is:

1. A fluid catalytic cracking reactor stripper, comprising:
   a) a plurality of stripping trays configured in a plurality of horizontal tray rows at differing elevations within the reactor stripper; wherein,
   b) each tray row is comprised of at least two chordal trays, wherein the tray internal angle, $\alpha$, of the chordal trays is from about 60° to about 150°; and
   c) at least one tray row is rotated such that the longitudinal axes of the tray row are at a different planar angle than the planar angle of the tray longitudinal axes of at least one other tray row in the reactor stripper.

2. The fluid catalytic cracking reactor stripper of claim 1, wherein the longitudinal axes of each tray row in the reactor stripper are oriented at planar angles selected from 0°, 30°, 45°, 60° and 90° with respect to at least one other tray row in the reactor stripper.

3. The fluid catalytic cracking reactor stripper of claim 2, wherein two or more adjoining tray rows in the reactor stripper have the same planar angle of tray longitudinal axes.

4. The fluid catalytic cracking reactor stripper of claim 2, wherein no adjoining tray rows in the reactor stripper have the same number of trays.

5. The fluid catalytic cracking reactor stripper of claim 1, wherein the chordal trays contain lips and holes.

6. The fluid catalytic cracking reactor stripper of claim 5, wherein the chordal trays contain flux tubes.

7. The fluid catalytic cracking reactor stripper of claim 6, wherein the holes are from about 0.5 to about 4.0 inches in diameter and the flux tubes are from about 4 to about 16 inches in internal diameter.

8. The fluid catalytic cracking reactor stripper of claim 1, wherein the chordal trays are arranged such that the tray row open area of each tray row in the reactor stripper is within 10% of the mean tray row open area of all the rows in the reactor stripper.

9. The fluid catalytic cracking reactor stripper of claim 8, wherein the chordal trays are arranged such that the tray row open area of each tray row in the reactor stripper is substantially the same as the mean tray row open area of all the rows in the reactor stripper.

10. The fluid catalytic cracking reactor stripper of claim 8, wherein two or more adjoining tray rows in the reactor stripper have the same planar angle of tray longitudinal axes.

11. The fluid catalytic cracking reactor stripper of claim 10, wherein no adjoining tray rows in the reactor stripper have the same number of trays, and the tray longitudinal axes of all tray rows in the reactor stripper are oriented at a planar angle selected from 0°, 30°, 45°, 60° and 90° with respect to all other tray rows in the reactor stripper.

12. The fluid catalytic cracking reactor stripper of claim 11, wherein the chordal trays are arranged such that the tray row open area of each tray row in the reactor stripper is within 10% of the mean tray row open area of all the rows in the reactor stripper.

13. The fluid catalytic cracking reactor stripper of claim 12, wherein the chordal trays are arranged such that the tray row open area of each tray row in the reactor stripper is within 5% of the mean tray row open area of all the rows in the reactor stripper.

14. The fluid catalytic cracking reactor stripper of claim 13, wherein the chordal trays are arranged such that the tray row open area of each tray row in the reactor stripper is substantially the same as the mean tray row open area of all the rows in the reactor stripper.

15. The fluid catalytic cracking reactor stripper of claim 8, wherein no adjoining tray rows in the reactor stripper have the same number of trays.

16. A fluid catalytic cracking process, comprising:
   a) contacting a hydrocarbon feed with regenerated catalyst in an external riser of a fluid catalytic cracking reactor to produce a cracked product and a spent catalyst;
   b) separating a portion of the cracked product from the spent catalyst in a reactor separation zone;
   c) passing the spent catalyst containing hydrocarbons to the inlet of a reactor stripper section comprised of chordal trays, wherein each tray row is comprised of at least two chordal trays, wherein the tray internal angle, $\alpha$, of the chordal trays is from about 60° to about 150°, and at least one tray row is rotated such that the chordal tray longitudinal axes of the tray row are at a different planar angle than the planar angle of the tray longitudinal axes of at least one other tray row in the reactor stripper section;
   d) contacting the spent catalyst with a stripping medium in the reactor stripper section;
   e) stripping at least a portion of the hydrocarbons from the spent catalyst in the reactor stripper section; and
   f) removing a stripped spent catalyst from the reactor stripper section.

17. The fluid catalytic cracking process of claim 16, wherein the hydrocarbon feed is selected from a gas oil, heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes, naphtha, and mixtures thereof.

18. The fluid catalytic cracking process of claim 16, wherein the catalyst includes a zeolite selected from ZSM-5, ZSM-11, ZSM-12, ZSM-22, ZSM-23, ZSM-35, ZSM-48, ZSM-57, SH-3, MCM-22, ReY, ReUSY, HY, faujasite, and combinations thereof.

19. The fluid catalytic cracking process of claim 16, wherein the hydrocarbon feed is contacted with the regenerated catalyst under short-contact time cracking conditions wherein the hydrocarbon feed contacts the cracking catalyst for less than about 5 seconds before entering the reactor separation zone.

20. The fluid catalytic cracking process of claim 19, wherein the longitudinal axes of each tray row in the reactor stripper section are oriented at planar angles selected from 0°, 30°, 45°, 60° and 90° with respect to at least one other tray row in the reactor stripper section.

21. The fluid catalytic cracking process of claim 20, wherein two or more adjoining tray rows in the reactor stripper section have the same planar angle of tray longitudinal axes, and no adjoining tray rows in the reactor stripper have the same number of trays.

22. The fluid catalytic cracking process of claim 21, wherein the short-contact time conditions include riser outlet temperatures from about 900° F. to about 1200° F. (482 to 649° C.), pressures from about 0 to about 100 psig (0 to 690 kPa) and contact times of hydrocarbon feed and cracking catalyst from about 1 to about 5 seconds.

23. The fluid catalytic cracking process of claim 22, wherein at least one tray row in the reactor stripper section is rotated such that the chordal tray longitudinal axes of the tray row are at a 90° planar angle to the planar angle of the tray longitudinal axes of at least one other tray row in the reactor stripper section.

* * * * *